(12) United States Patent
Tinnin

(10) Patent No.: US 8,763,491 B2
(45) Date of Patent: Jul. 1, 2014

(54) ADJUSTMENT ASSEMBLY HAVING A VARIABLE GEAR RATIO

(75) Inventor: Melvin Lee Tinnin, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 306 days.

(21) Appl. No.: 13/288,431

(22) Filed: Nov. 3, 2011

(65) Prior Publication Data

US 2013/0112023 A1    May 9, 2013

(51) Int. Cl.
*B62D 1/16* (2006.01)
*B62D 1/18* (2006.01)
*F16H 1/20* (2006.01)

(52) U.S. Cl.
USPC .......................................................... 74/493

(58) Field of Classification Search
USPC ............... 74/29–34, 492–498, 390, 393, 395, 74/396, 109, 541, 536, 571.1, 89.18, 74/89.19, 508, 422, 120, 445, 435, 433, 74/437, 431, 434; 180/75; 280/775–777, 280/779
See application file for complete search history.

(56) References Cited

U.S. PATENT DOCUMENTS

| | | | | |
|---|---|---|---|---|
| 2,973,658 A * | 3/1961 | Bishop | ............................. | 91/382 |
| 3,064,491 A * | 11/1962 | Bishop | ............................. | 74/437 |
| 3,918,313 A * | 11/1975 | Montagnino | ................... | 74/393 |
| 4,475,413 A * | 10/1984 | Higuchi | .......................... | 74/422 |
| 5,018,469 A * | 5/1991 | Carlson | ..................... | 114/144 R |
| 5,570,610 A * | 11/1996 | Cymbal | .......................... | 74/493 |
| 8,196,487 B2 * | 6/2012 | Bless et al. | ...................... | 74/437 |
| 2011/0167948 A1 * | 7/2011 | Andrearczyk et al. | .......... | 74/493 |

* cited by examiner

*Primary Examiner* — Troy Chambers
*Assistant Examiner* — Jake Cook
(74) *Attorney, Agent, or Firm* — Cantor Colburn LLP

(57) ABSTRACT

An adjustment assembly is provided, including a rack and a stepped gear. The rack has an array of rack teeth. The rack is moveable in a generally linear direction as an amount of force is exerted on the rack in the linear direction. The stepped gear includes an inner step and an outer step. One of the inner step and the outer step has a set of teeth. The set of teeth are meshed with the array of rack teeth. A center axis is oriented at about a center of the outer step. An axis of rotation is offset from the center axis of the stepped gear, and is configured to create a variable gear ratio between the set of teeth of the inner step or the outer step of the stepped gear and the array of rack teeth as the rack is moved in a linear direction.

19 Claims, 7 Drawing Sheets

US 8,763,491 B2

ADJUSTMENT ASSEMBLY HAVING A VARIABLE GEAR RATIO

BACKGROUND OF THE INVENTION

The present invention relates to an adjustment assembly and in particular to an adjustment assembly having a stepped gear that is rotated about an axis of rotation to create a variable gear ratio.

A push-pull type tilt lever assembly for a steering column assembly typically includes a tilt lever that is oriented in an axial direction relative to a steering column. The tilt lever facilitates locking and unlocking of the steering column assembly in tilt as well as telescopic operations. The tilt lever usually includes a cam assembly that is rotated to generate a force that releases or locks one or more brackets with a steering column shaft. Specifically, the steering column assembly may include a number of brackets such as, for example, a rake bracket and a compression bracket that are positioned relative to one another to facilitate adjustment of the steering column. An operator actuates the tilt lever by either pushing or pulling the tilt lever, which in turn locks or unlocks the steering column assembly.

Some drawbacks may exist when employing a cam assembly to release and lock the brackets in a steering column assembly. For example, sometimes the effort needed to actuate the tilt lever in a back and forth direction by an operator may vary, which is caused by eccentricity of the cam assembly. For example, in a 2-pin or 3-pin type cam, the pins travel within an angled or ramped slot, which creates the varying effort that is typically required by an operator.

SUMMARY OF THE INVENTION

An adjustment assembly is provided, including a rack and a stepped gear. The rack has an array of rack teeth. The rack is moveable in a generally linear direction as an amount of force is exerted on the rack in the linear direction. The stepped gear includes an inner step and an outer step. One of the inner step and the outer step has a set of teeth. The set of teeth are meshed with the array of rack teeth. A center axis is oriented at about a center of the outer step. An axis of rotation is offset from the center axis of the stepped gear, and is configured to create a variable gear ratio between the set of teeth of the inner step or the outer step of the stepped gear and the array of rack teeth as the rack is moved in a linear direction.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
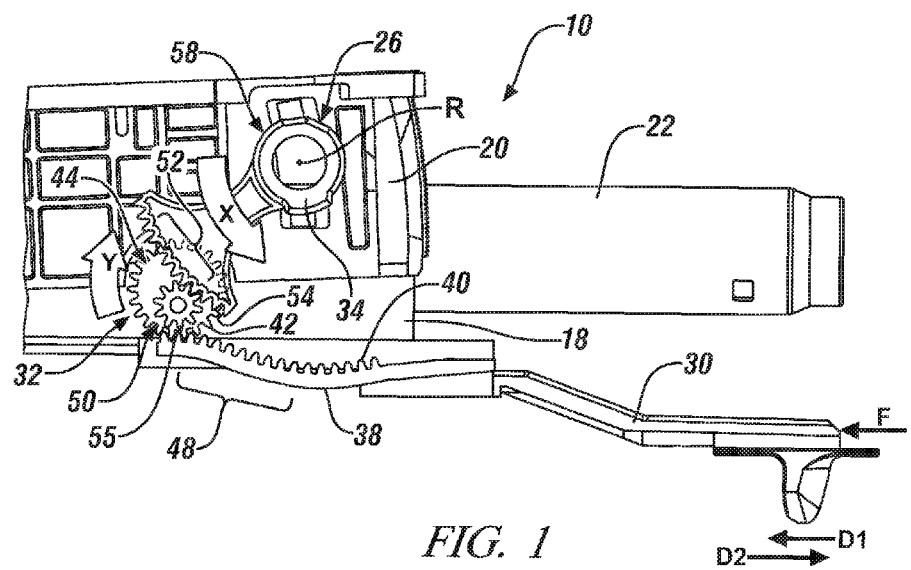
FIG. 1 is an illustration of an exemplary steering column in a locked position having an adjustment assembly in accordance with the invention.
Figure 2:
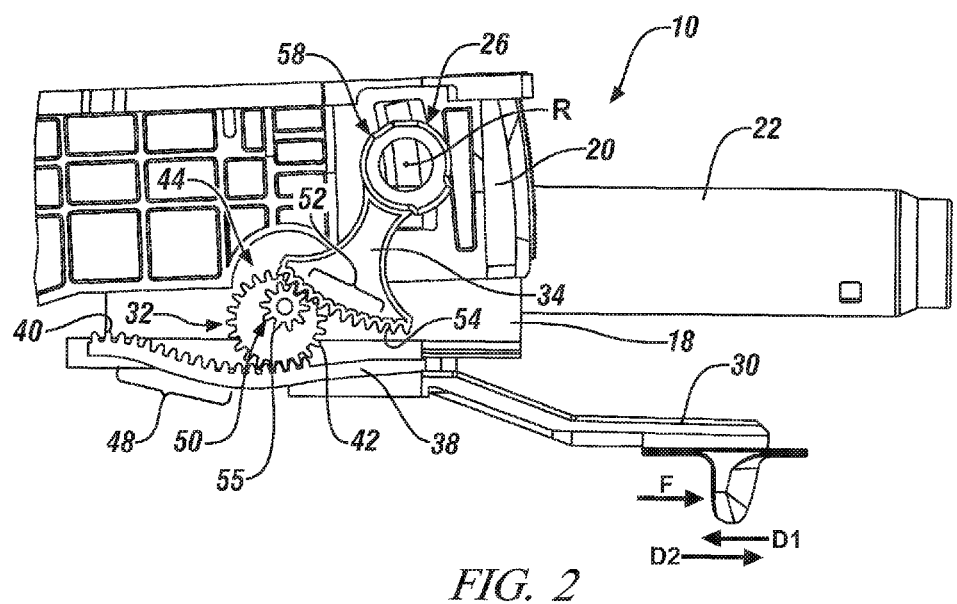
FIG. 2 is a unlocked view of the adjustment assembly shown in FIG. 1.

Referring now to the Figures, where the invention will be described with reference to specific embodiments, without limiting same, FIG. 1 illustrates a steering column assembly 10 in accordance with one aspect of the invention. In the exemplary embodiment shown, the steering column assembly 10 includes a compression bracket 18, a rake bracket 20, a steering column 22, and an adjustment assembly 26. The adjustment assembly 26 includes a push-pull type tilt lever 30, a stepped gear 32, a lever 34, and a cam assembly 36 (shown in FIG. 7). In the exemplary embodiment as shown in FIG. 1, the adjustment assembly 26 is employed in the steering column assembly 10 for facilitating adjustment of the steering column 22 in telescopic or tilt operations. Although FIGS. 1-10 illustrate the adjustment assembly 26 employed in a steering column 10, it is to be understood that the adjustment assembly 26 may be used in a variety of different applications as well such as, for example, an adjustable seat, a hood release or a parking brake release.

An operator may selectively exert a force F on the tilt lever 30 that actuates the tilt lever 30 back and forth in generally linear directions D1 or D2. Movement of the tilt lever 30 in the directions D1 and D2 will either clamp or unlock the compression bracket 18 and the rake bracket 20 with the steering column 22. Specifically, the tilt lever 30 is actuated in the direction D1 towards the adjustment assembly 26 to actuate the adjustment assembly 26 from an unlocked or first position (shown in FIG. 1) into a locked or second position (shown in FIG. 2). In the locked position, the compression bracket 18 and the rake bracket 20 are clamped against the steering column 22. The tilt lever 30 is actuated in the direction D2 away from the adjustment assembly 26 to actuate the adjustment assembly 26 from the locked position (shown in FIG. 2) into the unlocked position as shown in FIG. 1. Referring to both of FIGS. 1-2, the tilt lever 30 includes a rack portion 38 having an array of teeth 40. The teeth 40 of the rack portion 38 are configured for meshing with a set of outer teeth 42 that are located along an outer step 44 of the stepped gear 32. The rack portion 38 further includes a non-linear or generally arcuate profile 48.

The stepped gear 32 includes a stepped configuration having two distinct gear profiles for meshing with separate components. Specifically, in the embodiment as illustrated, the stepped gear 32 includes an inner step 50 and the outer step 44. The inner step 50 has a diameter that is less than a diameter of the outer step 44. The inner step 50 is configured to mesh with the lever 34 and the outer step 44 is configured to mesh with the rack portion 38 of the tilt lever 30. The lever 30 includes a generally curved or arcuate profile 52 and a set of lever teeth 54. The set of lever teeth 54 mesh with a set of inner teeth 55 of the inner step 50. In one exemplary embodiment, the set of outer teeth 42 and the set of inner teeth 55 of the stepped gear 32 both include a spur gear profile (not shown).

Figure 3:
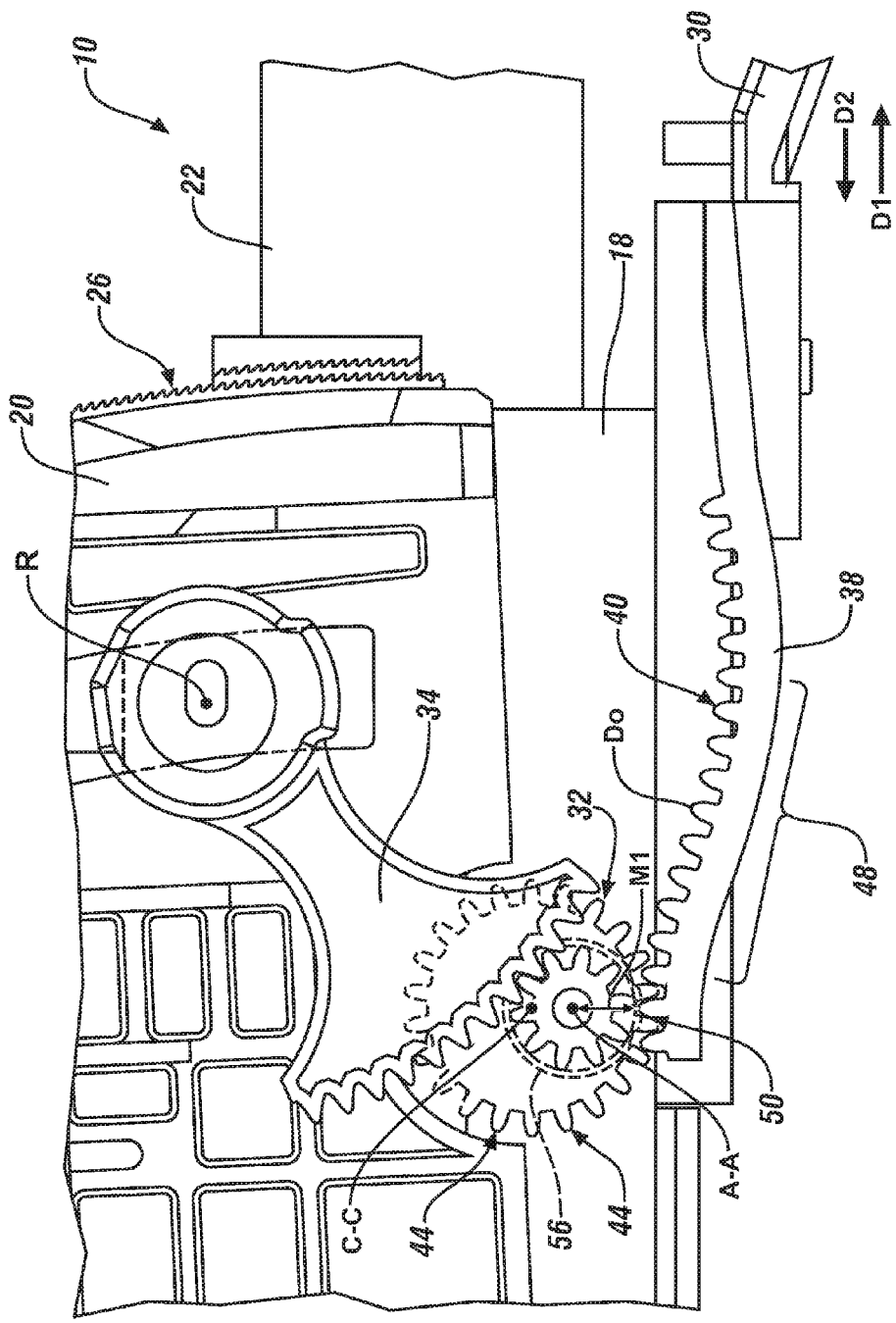
FIG. 3 is a view of another aspect of the invention.

Referring now to FIG. 3, which is an enlarged view of the adjustment assembly 26 in the unlocked position as shown in FIG. 1, the stepped gear 32 has a center axis C-C as well as an axis of rotation A-A. The center axis C-C is oriented at about a center of the outer step 44. The inner step 50 is oriented at an offset relative to the outer step 44 such that the inner step 50 has an inner center that is located at about the axis of rotation A-A, and the outer step 44 has an outer center that is located at the center axis C-C. That is, the inner step 50 is not concentric with the outer step 44. Thus, because the inner step 50 is offset from the outer step 44, the axis of rotation A-A of the stepped gear 32 is also offset from the center axis C-C. Therefore, the axis of rotation A-A of the stepped gear 32 is an eccentric axis of rotation. In one embodiment, the inner step 50 rotates about a bolt 56 (shown in phantom line) connected to the compression bracket 18.

Figure 4:
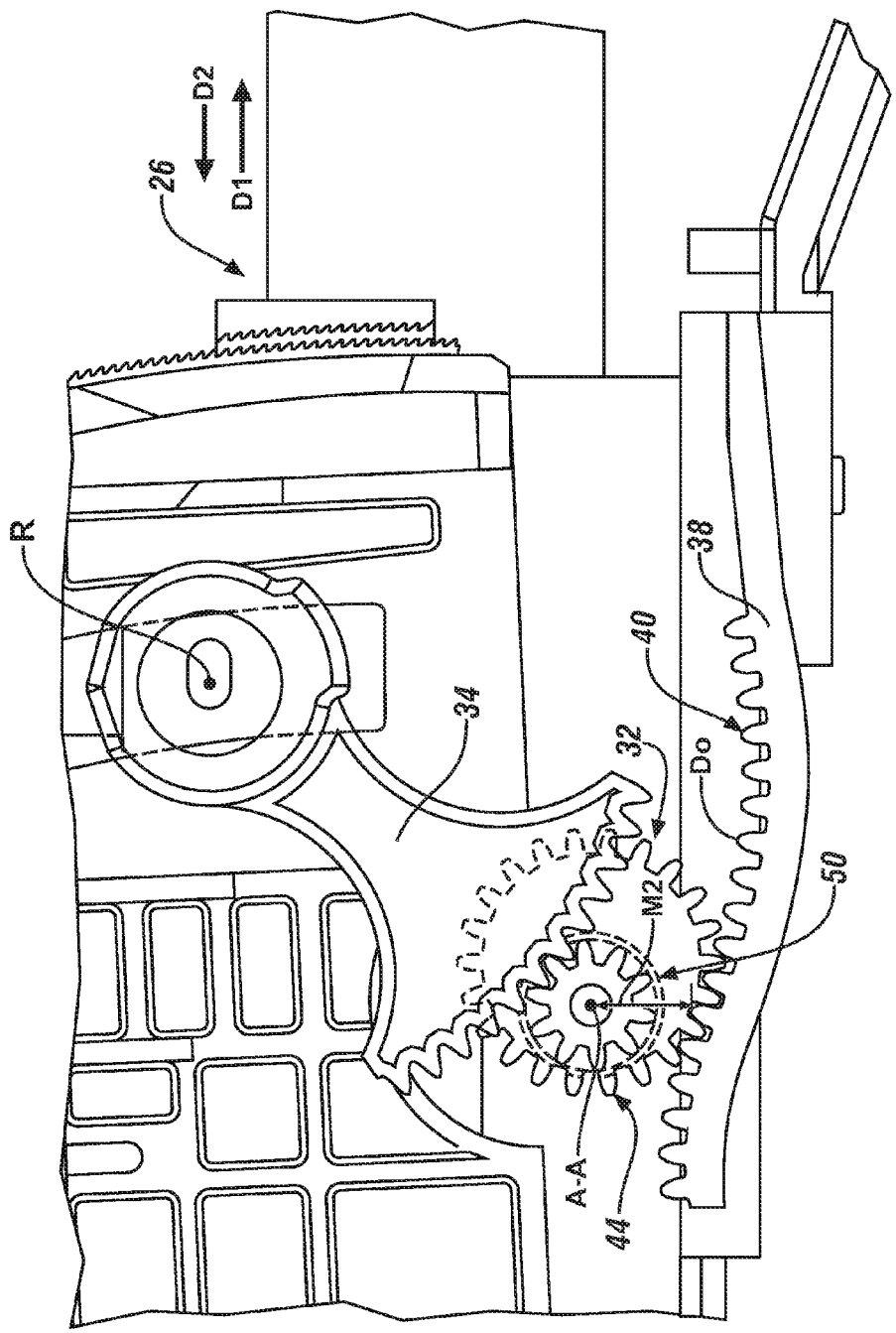
FIG. 4 is a view of yet another aspect of the invention.
Figure 5:
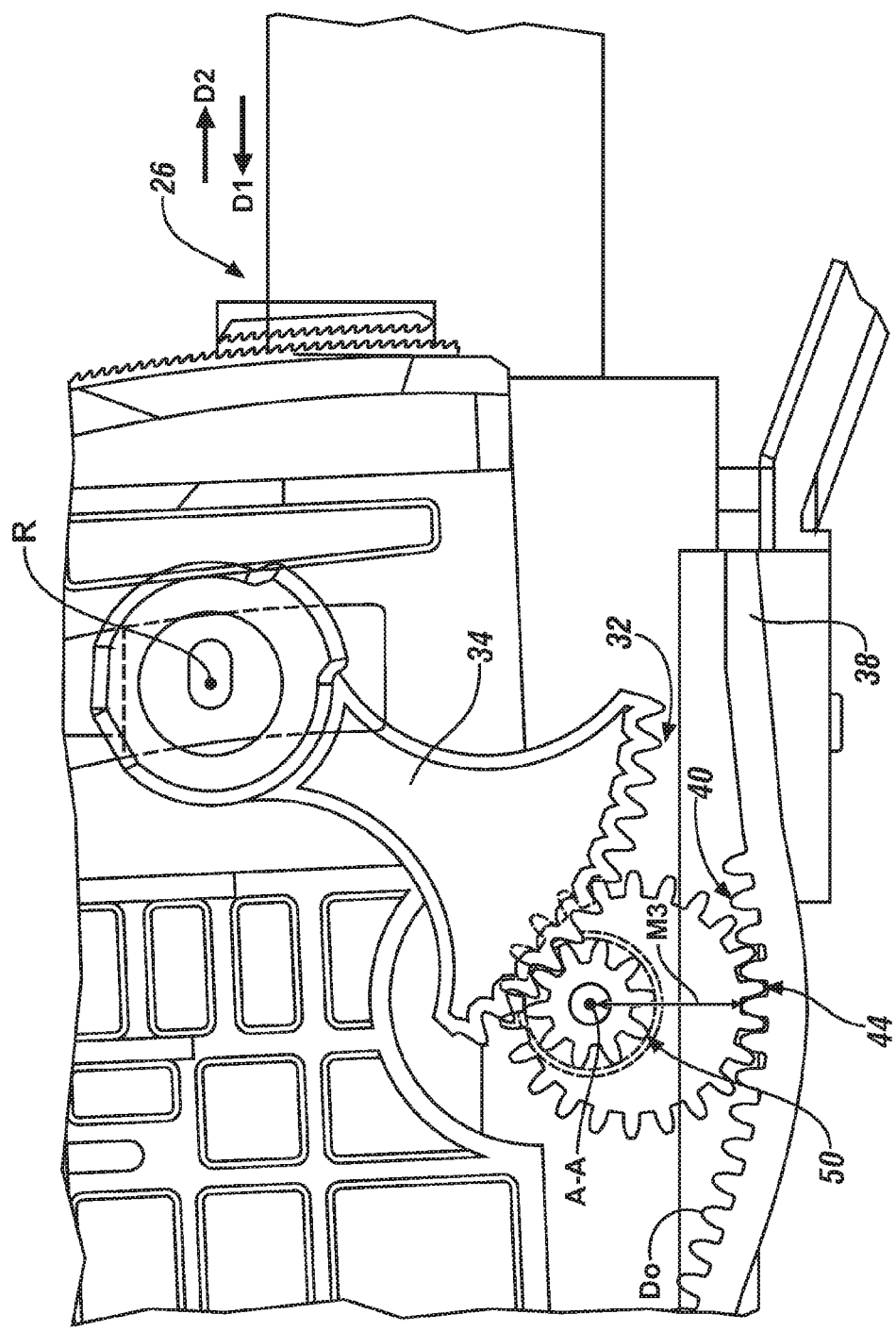
FIG. 5 is a view of still yet another aspect of the invention.

Continuing to refer to FIG. 3, the rack portion 38 includes the arcuate profile 48 that corresponds with the axis of rotation A-A of the stepped gear 32. That is, as the stepped gear 32 rotates about the axis of rotation A-A, the position of the stepped gear 32 will vary with respect to the rack portion 38. Thus, the rack portion 38 includes the arcuate profile 48 in an effort to accommodate or correspond to the eccentric movement of the inner step 50 of the stepped gear 32 as the stepped gear 32 is rotated about the axis of rotation A-A. Specifically, FIGS. 3-5 illustrate the position of the stepped gear 32 relative to the rack portion 38 as the stepped gear 32 advances in the direction D2.

Referring to FIG. 3, when in the unlocked position, the axis of rotation A-A is located at a first distance M1 when measured from the outer face Do of the teeth 40 of the rack portion 38. As the stepped gear 32 is advanced in the direction D2, the distance between the axis of rotation A-A of the stepped gear 32 and the outer face Do of the teeth 40 vary. Turning now to FIG. 4, a second distance M2 is measured between the outer face Do of the teeth 40 of the rack portion 38 and the axis of rotation A-A as the stepped gear 32 is moved in the direction D2. The second distance M2 is greater than the first distance M1. Referring now to FIG. 5, as the stepped gear 32 is moved even further along rack portion 38, a third distance M3 is measured between the outer face Do of the teeth 40 of the rack portion 38 and the axis of rotation A-A. The third distance M3 is greater than the second distance M2 and the first distance M1.

Figure 6:
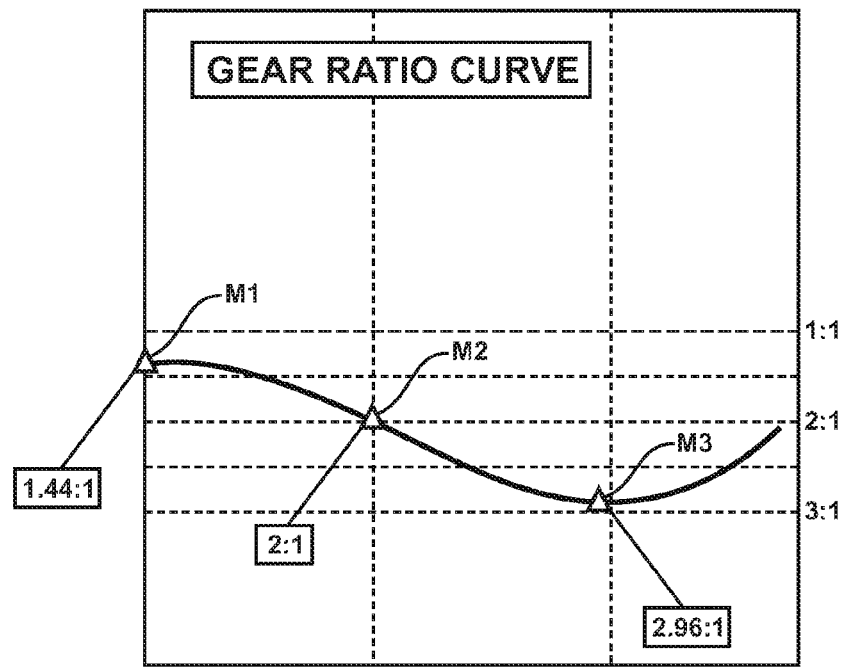
FIG. 6 is an illustration of an exemplary gear ratio curve of the adjustment assembly shown in FIG. 1, according to yet another aspect of the invention.

As the distance between the axis of rotation A-A of the stepped gear 32 and the outer face Do of the teeth 40 vary, a gear ratio between the set of outer teeth 42 located along the outer step 44 of the stepped gear 32 and the teeth 40 of the rack portion 38 also varies as well. Specifically, a variable gear ratio is created between the outer step 44 of the stepped gear 32 and the teeth 40 of the rack portion 38 as the stepped gear 32 is moved in either direction D1 or D2. FIG. 6 is an exemplary illustration of one embodiment of a variable gear ratio curve between the stepped gear 32 and the rack portion 38. It should be noted that FIG. 6 is exemplary only, and that other gear ratio curves may be used as well. Specifically, the arcuate profile 48 of the rack portion 38 as well as the position of the axis of rotation A-A of the stepped gear 32 may be tuned or adjusted in other embodiments to modify the variable gear ratio curve.

One example of a variable gear ratio curve created by the adjustment assembly 26 will now be discussed. Referring now to FIGS. 3 and 6, when the stepped gear 32 is positioned such that the axis of rotation A-A is located at the first distance M1 when measured from the outer face Do of the teeth 40, the gear ratio between the set of outer teeth 42 of the stepped gear 32 and the teeth 40 of the rack portion 38 is about 1.44:1. As the stepped gear 32 is advanced in the direction D2, the gear ratio will change. Specifically, referring to FIGS. 4 and 6, when the stepped gear 32 is positioned such that the axis of rotation A-A is located at the second distance M2 when measured from the outer face Do of the teeth 40, the gear ratio between the set of outer teeth 42 of the stepped gear 32 and the teeth 40 of the rack portion 38 is about 2:1. Finally, when the stepped gear 32 is positioned such that the axis of rotation A-A is located at the third distance M3 when measured from the outer face Do of the teeth 40, the gear ratio between the set of outer teeth 42 of the stepped gear 32 and the teeth 40 of the rack portion 38 is about 2.96:1.

Figure 7:
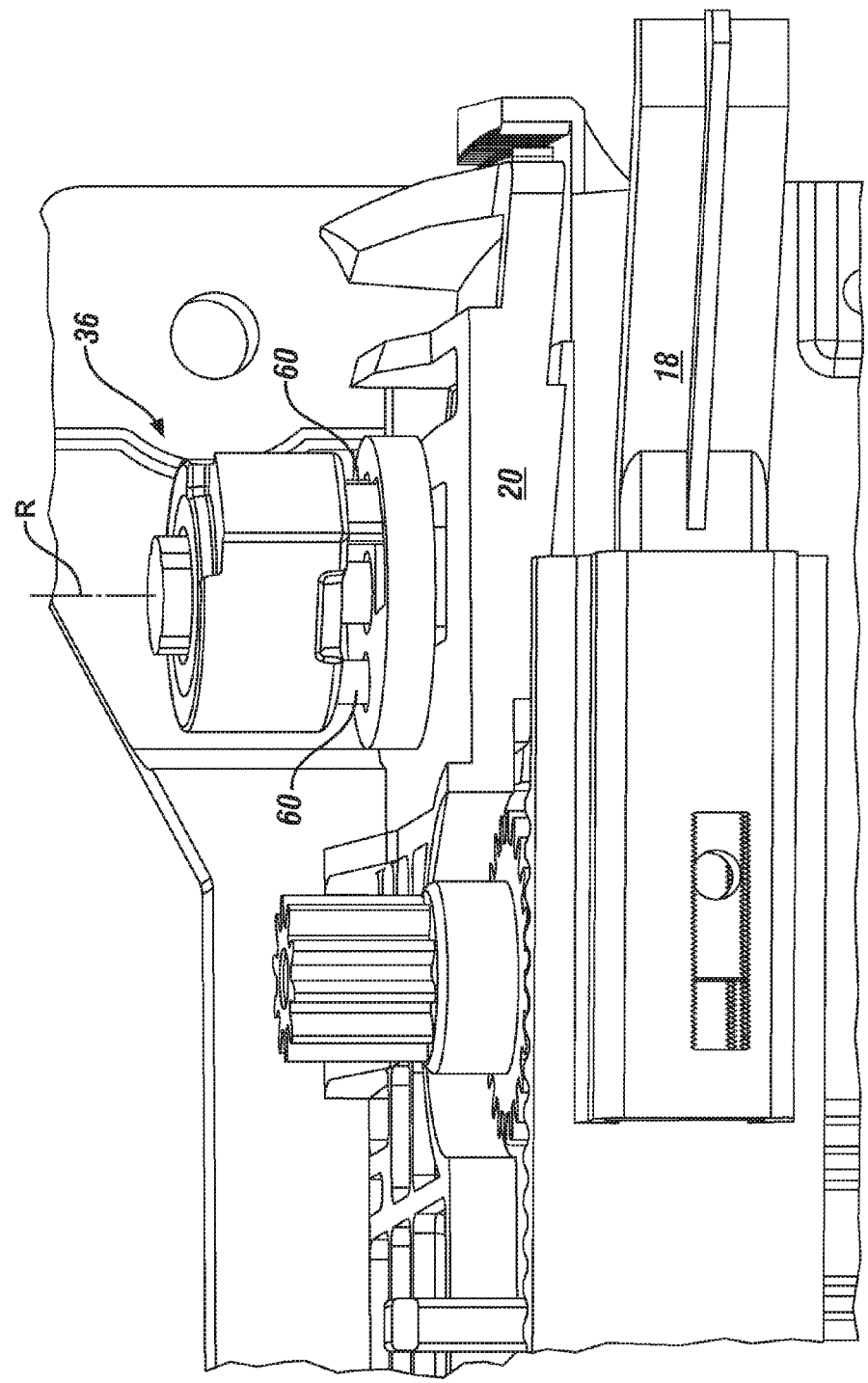
FIG. 7 is an illustration a cam assembly of still yet another aspect of the invention.

Referring back to FIGS. 1-2, the lever 30 is rotated about an axis of rotation R as the stepped gear 32 is rotated about the axis of rotation R. Specifically, in one embodiment as the tilt lever 30 is actuated in the direction D1, the outer step 44 is rotated in a clockwise or outer direction that is indicated by the arrow labeled Y and the inner step 50 is rotatable in a clockwise or inner direction X, where the outer direction Y generally opposes the inner direction X. As the lever 30 is rotated by the stepped gear 32, this in turn will cause the cam assembly 36 (shown in FIG. 7) to rotate. Referring to both FIGS. 1-2 and 7, the cam assembly 36 is engaged with and received by an end 58 of the lever 34. The cam assembly 36 is rotated about the axis of rotation R to either clamp or unlock the compression bracket 18 and the rake bracket 20 with the steering column 22 (shown in FIGS. 1-2). In the exemplary embodiment as shown in FIG. 7, the cam assembly 36 is a 2-pin type cam assembly having two pins 60, however it is to be understood that a variety of other cam devices may be used as well. For example, in an alternative embodiment, which is not illustrated, the cam assembly 36 may be a 3-pin cam or a clamping type cam assembly as well.

Figure 8:
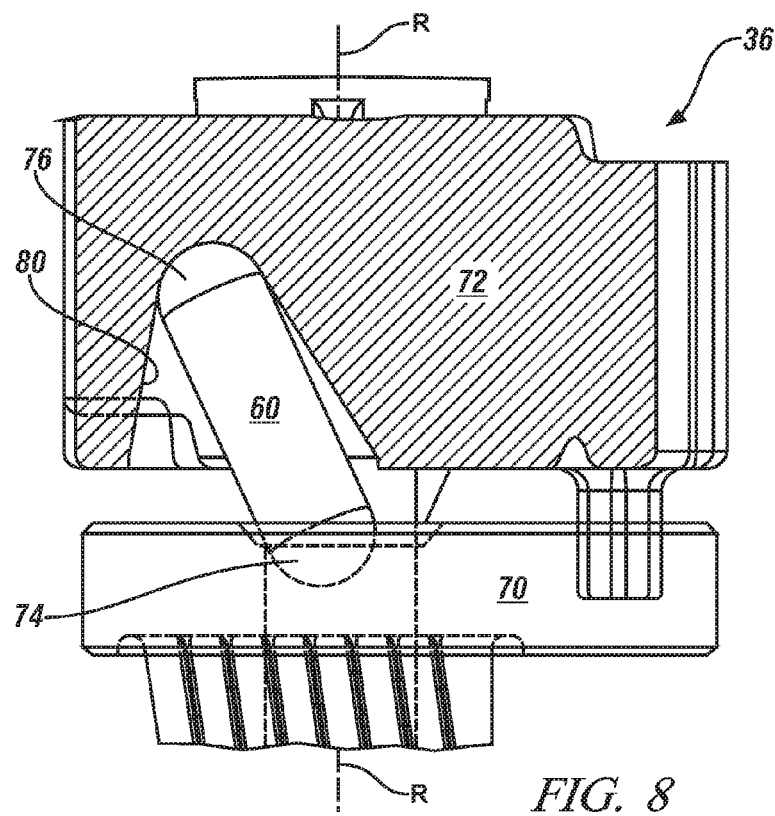
FIG. 8 is an illustration of a cam pin of the cam assembly shown in FIG. 7.
Figure 9:
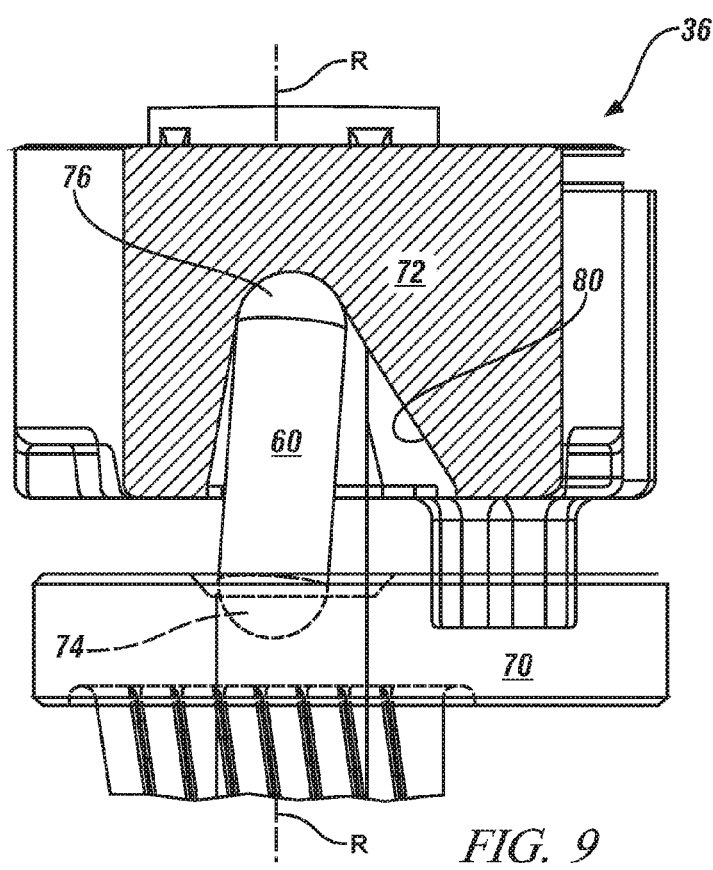
FIG. 9 is another illustration of the cam pin shown in FIG. 8.

FIGS. 8-9 are views of one of the pins 60 as the cam assembly 36 rotates about the axis of rotation R. FIG. 8 illustrates the position of one of the pins 60 of the cam assembly 36 when the adjustment assembly 26 is in the unlocked position (shown in FIG. 1). The pins 60 are received by a first cam plate 70 and a second cam plate 72. The pins 60 include a first end 74 that is received by the first cam plate 70 and a second end 76 that is received by the second plate 72. In the embodiment as shown, the second plate 72 includes a ramped recess 80, where the second end 76 of the pins 60 are received and may selectively slide about in the ramped recess 80. Referring now to FIGS. 1-2 and 8-9, as an operator selectively exerts the force F on the tilt lever 30 to actuate the tilt lever 30 in either direction D1 or D2, the cam assembly 36 rotates about the axis of rotation R, and causes the second end 76 of the pin 60 to slide within the ramped recess 80.

Figure 10:
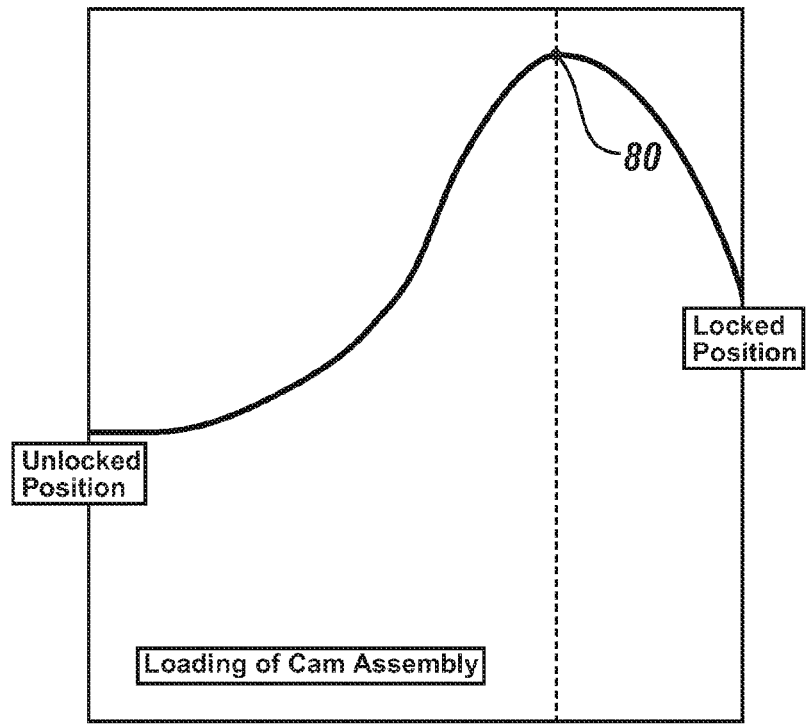
FIG. 10 is an illustration of an exemplary load curve of the cam assembly shown in FIG. 7, according to yet another aspect of the invention.

FIG. 9 is an illustration of one of the pins 60 at a position of about peak load (the pin 60 is also in a position of peak load in FIG. 7 as well). That is, when the pin 60 is oriented within the ramped recess 80 such that the pin 60 is generally parallel with the axis of rotation R of the cam assembly 36, the cam assembly 36 will provide the greatest amount of resistance to rotation about the axis of rotation R. FIG. 10 is an illustration of a variable load curve of the cam assembly 36. The position shown in FIG. 9 of the pin 60 coincides with a peak load 82 of the cam assembly 36. Moreover, referring now to FIGS. 3, 6, and 9-10, the adjustment assembly 26 is configured for providing a peak gear ratio when the cam assembly 36 produces the peak load 82. That is, when the pins 60 of the cam assembly 36 are oriented in the ramped recess 80 to be generally parallel with the axis of rotation R (shown in FIG. 9), the adjustment assembly 26 will be positioned in the configuration as shown in FIG. 5, where the axis of rotation A-A of the stepped gear 32 is located at the third distance M3.

A higher gear ratio translates into a lower amount of force F that an operator is required to exert on the tilt lever 30 to actuate the tilt lever 30 in the directions D1 and D2. The adjustment assembly 26 provides a mechanical advantage. This in turn translates to a lower amount of force F that needs to be exerted on the tilt lever 30 by an operator. Therefore, as the cam assembly 36 provides a greater amount of resistance due to the position of the pins 60 within the ramped recess 80, the adjustment assembly 26 in turn provides the corresponding variable gear ratio. As such, an increased amount of resistance from the cam assembly 36 results in an increased gear ratio and the resistance and the gear ratio are generally proportional. Therefore, the force F required to actuate the tilt lever 30 in the directions D1 and D2 by an operator will be more uniform and will not generally increase with the camming effect of pins 60, due to the variable gear ratio that is created by the adjustment assembly 26. This in turn will provide a more uniform effort that is required by an operator to actuate the tilt lever 30.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustment assembly, comprising:
   a rack having an array of rack teeth, the rack moveable in a generally linear direction as an amount of force is exerted on the rack in the linear direction; and
   a stepped gear comprising:
      an inner step and an outer step, one of the inner step and the outer step having a set of teeth, the set of teeth meshed with the array of rack teeth;
      a center axis oriented at about a center of the outer step;
      an axis of rotation that is offset from the center axis of the stepped gear configured to create a variable gear ratio between the set of teeth of the inner step or the outer step of the stepped gear and the array of rack teeth as the rack is moved in a linear direction between a first position and a second position;
      a lever that is selectively rotated about a lever axis of rotation by rotation of the stepped gear; and
      an adjustment assembly comprising a cam assembly that is received by a portion of the lever, rotation of the lever configured to rotate the cam assembly about the lever axis of rotation.

2. The adjustment assembly as recited in claim 1, wherein the, lever has a set of lever teeth and the outer step of the stepped gear has a set of outer teeth and the inner step of the stepped gear has a set of inner teeth, and wherein the set of inner teeth is meshed with the set of lever teeth.

3. An adjustment assembly, comprising:
   a rack having an array of rack teeth, the rack moveable in a generally linear direction as an amount of force is exerted on the rack in the linear direction; and
   a stepped gear comprising:
      an inner step and an outer step, one of the inner step and the outer step having a set of teeth, the set of teeth meshed with the array of rack teeth;
      a center axis oriented at about a center of the outer step;
      an axis of rotation that is offset from the center axis of the stepped gear configured to create a variable gear ratio between the set of teeth of the inner step or the outer step of the stepped gear and the array of rack teeth as the rack is moved in a linear direction between a first position and a second position;
      a lever that is selectively rotated about a lever axis of rotation by rotation of the stepped gear, wherein the level has a set of lever teeth; and
      a cam assembly that is received by a portion of the lever, wherein rotation of the lever rotates the cam assembly about the lever axis of rotation.

4. The adjustment assembly as recited in claim 3, wherein the cam assembly is configured to produce a variable load curve for rotating the cam assembly about the lever axis of rotation, and the variable load curve includes a peak load.

5. The adjustment assembly as recited in claim 4, wherein the variable gear ratio includes a peak gear ratio, and wherein the adjustment assembly is configured to provide the peak gear ratio as the cam assembly produces the peak load.

6. An adjustment assembly, comprising:
   a rack having an array of rack teeth, the rack moveable in a generally linear direction as an amount of force is exerted on the rack in the linear direction; and
   a stepped gear comprising:
      an inner step and an outer step, one of the inner step and the outer step having a set of teeth, the set of teeth meshed with the array of rack teeth;
      a center axis oriented at about a center of the outer step;
      an axis of rotation that is offset from the center axis of the stepped gear configured to create a variable gear ratio between the set of teeth of the inner step or the outer step of the stepped gear and the array of rack teeth as the rack is moved in a linear direction between a first position and a second position,
      a lever that is selectively rotated about a lever axis of rotation by rotation of the stepped gear, wherein the lever has a set of lever teeth;
      a compression bracket, a rake bracket, a steering column, and a cam assembly received by a portion of the lever and being configured to rotate about the lever axis of rotation between a clamp position and an unlock position of the compression bracket and the rake bracket with the steering column.

7. The adjustment assembly as recited in claim 1, wherein the inner step includes an inner center, and wherein the axis of rotation of the stepped gear is located at the inner center.

8. The adjustment assembly as recited in claim 1, wherein the outer step is rotatable in an outer direction and the inner step is rotatable in an inner direction, wherein the outer direction generally opposes the inner direction.

9. The adjustment assembly as recited in claim 1, wherein the rack includes a generally arcuate profile, and wherein the arcuate profile is shaped to accommodate an eccentric movement of the inner step.

10. The adjustment assembly as recited in claim 1, wherein the adjustment assembly is part of a steering column assembly.

11. An adjustment assembly for a steering column, comprising:
    a rack having an array of rack teeth, the rack moveable in a generally linear direction between a first position and a second position as an amount of force is exerted on the rack in the linear direction;
    a lever selectively rotated about a lever axis of rotation, the lever having a set of lever teeth;

a cam assembly that is received by a portion of the lever, the lever being configured to rotate the cam assembly about the lever axis of rotation; and a stepped gear comprising:
- an inner step having a set of inner teeth;
- an outer step having a set of outer teeth, one of the set of inner teeth and the set of outer teeth configured to mesh with the set of lever teeth, the other one of the set of inner teeth and outer teeth configured to mesh with the rack of array teeth;
- a center axis oriented at about a center of the outer step; and
- an axis of rotation that is offset from the center axis of the stepped gear between the other one of the set of inner teeth and the set of outer teeth of the stepped gear and the array of rack teeth if the rack is moved between the first position and the second direction and configured to create a variable gear ratio between one of the set of inner teeth and the set of outer teeth of the stepped gear and the array of rack teeth, the lever being selectively rotatable about the lever axis of rotation by rotation of the stepped gear.

12. The adjustment assembly as recited in claim 11, wherein the cam assembly is configured to produce a variable load curve for rotating the cam assembly about the lever axis of rotation, and the variable load curve includes a peak load.

13. The adjustment assembly as recited in claim 12, wherein the variable gear ratio includes a peak gear ratio, and the adjustment assembly is configured to provide the peak gear ratio as the cam assembly produces the peak load.

14. The adjustment assembly as recited in claim 11, comprising a compression bracket, a rake bracket, and a steering column, and the cam assembly being configured to rotate about the lever axis of rotation between a clamp position or an unlock position of the compression bracket and the rake bracket with the steering column.

15. The adjustment assembly as recited in claim 11, wherein the inner step includes an inner center, and wherein the axis of rotation of the stepped gear is located at the inner center.

16. The adjustment assembly as recited in claim 11, wherein the outer step is rotatable in an outer direction and the inner step is rotatable in an inner direction, wherein the outer direction generally opposes the inner direction.

17. The adjustment assembly as recited in claim 11, wherein the rack includes a generally arcuate profile, and wherein the arcuate profile is shaped to accommodate an eccentric movement of the inner step.

18. An adjustment assembly for a steering column, comprising:
- a rack having a generally arcuate profile and an array of rack teeth, the rack moveable in a generally linear direction between a first position and a second position as an amount of force is exerted on the rack in the linear direction;
- a lever that is selectively rotated about a lever axis of rotation, the lever having a set of lever teeth;
- a cam assembly that is received by a portion of the lever, the lever being configured to rotate the cam assembly about the lever axis of rotation, the cam assembly configured to produce a variable load curve for rotating the cam assembly about the lever axis of rotation, the variable load curve including a peak load; and
- a stepped gear comprising:
  - an inner step having a set of inner teeth;
  - an outer step having a set of outer teeth, one of the set of inner teeth and the set of outer teeth configured to mesh with the set of lever teeth, the other one of the set of inner teeth and outer teeth configured to mesh with the rack of array teeth;
  - a center axis oriented at about a center of the outer step; and
  - an axis of rotation that is offset from the center axis of the stepped gear between the other one of the set of inner teeth and the set of outer teeth of the stepped gear and the array of rack teeth if the rack is moved between the first position and the second direction and configured to create a variable gear ratio between one of the set of inner teeth and the set of outer teeth of the stepped gear and the array of rack teeth, the lever being selectively rotatable about the lever axis of rotation by rotation of the stepped gear, and the variable gear ratio includes a peak gear ratio where the adjustment assembly is configured for providing the peak gear ratio when the cam assembly produces the peak load, and the arcuate profile is shaped to accommodate an eccentric movement of the inner step.

19. The adjustment assembly as recited in claim 18, wherein the inner step includes an inner center, and wherein the axis of rotation of the stepped gear is located at the inner center.

* * * * *